United States Patent Office 2,787,325
Patented Apr. 2, 1957

2,787,325

SELECTIVE TREATMENT OF GEOLOGICAL FORMATIONS

Orrin C. Holbrook, Crystal Lake, Ill., assignor to The Pure Oil Company, Chicago, Ill., a corporation of Ohio No Drawing. Application December 24, 1954, Serial No. 477,589

8 Claims. (Cl. 166—22)

This invention relates to a complementary method for use in facilitating the completion or stimulation of fluid-producing zones having erratic permeability by means of formation penetrators.

Increased fluid production from subterranean reservoirs can be effected by a number of techniques, such as acidizing or hydraulic fracturing, which enhance the efficiency of reservoir drainage. In employing these techniques wherein fluid-treating compositions are forced into the formation, e. g., acidizing or hydraulic fracturing, it is desirable to take preliminary steps in treating formations having varying intrazone permeability to insure that most of the treating fluid is injected into the less permeable streaks while little or no treating fluid is introduced into the more permeable streaks. To facilitate an understanding of the instant invention, the following geological structural distinctions will be made:

A formation is any sedimentary bed or stratum sufficiently homogeneous to be regarded as a unit. Fluids such as petroleum oil, gas, and/or water may be found distributed throughout the formation or only in intervals or zones of the formation. Although a formation may be substantially homogeneous in composition, formations do occur which vary transversely in permeability due to the presence of random veins which vary, respectively, in permeability. Where the veins are relatively thin they are referred to as streaks. There are frequently encountered intervals or zones in the formation with alternating or successive streaks of varying permeabliity whereein different ratios of more permeable streaks to less permeable streaks are encountered. As a general rule, it would be preferred if the formation penetrator was introduced into those streaks having permeabilities of less than about 75 millidarcies. The selective directing of the fluid-treating agent into the less permeable streaks is advantageous because maximum enhancement of the flow characteristics of a formation can be obtained with a minimum amount of treating fluid.

It is therefore an object of this invention to provide an expedient to permit the selective treatment of producing intervals with formation penetrators. Another object of this invention is to provide a method for controlling the flow of the treating agent within the well bore so that it will penetrate only the formation streaks of lesser permeability. It is also an ob,ject of this invention to provide a temporary sealant for shutting off the more permeable streaks of a fluid-producing formation to control the introduction of fluid, treating agents. It is also another object of this invention to provide an economical formation sealant which will selectively seal intervals of relatively high permeability and which can readily be removed from the formation interstices when desired.

In overcoming interzone and intrazone permeability differentials, a number of procedures are available. Perhaps the basic or primary method for selectively treating intervals of lower permeability is the so-called two-pump procedure wherein surface oil is pumped into the annulus between the tubing and the well casing while the fluid-treating reagent, such as acid, is pumped down the tubing and into the formation. Other methods for placing the flow of fluid-treating agent at the proper area within the well bore employ acid jet-guns for applying acid to the face of the formation by a jetting action. In addition, mechanical packers or other types of temporary tubing bridge-plugs are used to isolate the less permeable interval from the more permeable sections of the producing formation. However, in employing these expedients, entire intervals or zones are treated which include not only the less permeable streaks but also the more permeable streaks found therein.

The selective treatment of the less permeable sections of fluid-producing formations is also effected by selectively plugging the more permeable sections of the formation. A wide variety of plugging materials, such as cement, colloidal clays, wax distillate, paper pulp, chemicals that metathetically react to produce an insoluble substance, air and gas (Jamin action), colloidal dispersions of rosin or paraffin wax, resin emulsions, and gelled plugging agents such as petroleum distillates which have been thickened with a suitable gelling agent, e. g., kerosene thickened with a hydroxy aluminum soap, may be employed. Most of these materials, however, are not inherently selective in that producing formations of varying permeability cannot be contacted indiscriminately with the materials to seal only the sections having high permeability, leaving relatively unaffected the sections of low permeability. As in the use of mechanical expedients in the sealing of geological formations of this nature, it is necessary to isolate a specific zone by mechanical packers or other suitable formation isolation means. The sealant is then introduced into the isolated section, completely sealing off not only the channels of greater permeability but also the less permeable streaks within the isolated zone.

According to this invention, advantage is taken of the variations in flow characteristics of a geological formation having random streaks having high and low values of permeability. It has been found that the more permeable streaks are more affected by contact with a heat-transfer medium than the less permeable streaks. Although there are no appreciable variations in heat-transfer characteristics between the strata of different permeabilities, advantage may be taken of the flow differentials which exist in adjacent streaks to produce a temperature differential within the formation containing said streaks. When the heating medium is injected more of it will flow through the loose streaks than will flow through the tight streaks, thus more heat is injected into the loose streaks than into the tight streaks. The formation is then allowed to partially cool. During this interval the less permeable streaks cool much faster than the streaks of higher permeability. Thereafter, a colloidal sol which will coagulate at the higher temperatures existing in the more permeable streaks is introduced into the well bore and forced into the formation. Accordingly, when the sol is passed into the formation, it gelates in and isolates the hotter zones of higher permeability but does not gel to any appreciable extent in the cooler zones of low permeability. After the more permeable streaks have been isolated in this manner, the treated formation is contacted with another treating agent, such as an acid or fracturing fluid, whereby the fluid is selectively introduced into the streaks of lower permeability. Another alternative involves the introduction of the sol into the formation immediately after heating. This expedient is the preferred method. In this instance the sol would indiscriminately enter both the loose and tight streaks and solidify in the formation. On cooling, the tight streaks would cool faster than the loose streaks and, hence, the gel disposed therein would liquefy while the gelatinous sealant in the more permeable streaks would remain solid.

The following example illustrates the instant invention and serves to demonstrate how in one of its embodiments it may be employed in the selective acidization of a limestone formation:

The formation to be treated is oolitic limestone of varying permeability forming part of a partially depleted reservoir which is being water-flooded in the course of recovering the residual oil by secondary recovery means. Situated at a depth of about 3,230 feet, the formation will be at a temperature of about 90° F. After disposing an electric heater in the traversing 5½" bore hole at a position adjacent the top of the formation face exposed by the bore hole, 500 gallons of water are introduced into the bore hole. 100 gallons of the temperature-sensitive sealant, consisting of an aqueous solution containing 1.6% of methyl-cellulose having a methoxyl content of 35.4%, are then injected. This solution has a transition point of about 105–120° F. Following this, a 15% hydrochloric acid solution is injected. When the 500 gallons of water initially introduced reaches the bottom of the well, the heater is turned on. By adjusting either the heat input and/or the injection rate, the temperature of the water entering the formation is maintained at about 145° F. When this 500 gallons of water has been injected into the formation, the heater is shut off; however, the pumping is continued. This will force the gelling liquid into the formation. The injection pressure will rise sharply as the liquid thickens in the heated formation. When all of the 100 gallons of gelling liquid has entered the formation, the pumping is stopped. The well will maintain pressure for a considerable time, due to the fact that all of the formation surrounding the well bore is plugged with thickened gel. When this pressure starts to drop rapidly (indicating that the gel in some part of the formation has liquefied by cooling), the injection of the hydrochloric acid is initiated and continues until the treatment is finished.

In order to heat the formation which is undergoing treatment, a number of expedients may be employed. Heating is effected by direct heat exchange, wherein any suitable liquid heat-transfer medium may be introduced into the formation in order to substantially raise its temperature. Specific examples of such heating media include such inorganic substances as water, brine, steam, etc., as well as organic substances, including petroleum oils, gasoline, naphtha, and benzene. The heat-transfer medium may be heated to the desired elevated temperature prior to being introduced into the bore hole or the heat-transfer agent at ambient temperature may be introduced into the formation and then heated. In this latter instance heating is effected by contacting the heat-transfer agent remaining in the bore hole with a suitable immersion heater whereby heat is radiated from the walls of the heater and transmitted through the wall of the well bore. An electrical heater, so-called submerged burners, such as combustion heaters wherein heat is supplied by combustion processes, or other equivalent devices may be used. It is obvious that the amount of heat which the formation requires will depend upon the normal formation temperature. Normally, the formation temperature will increase as the depth of bore hole increases. The formation temperature increases at varying rates, depending upon stratigraphic conditions. Accordingly, no specific relation between temperature and depth can be categorically set forth. Normally, the temperature increases about one degree for every 50–60 feet of depth. However, abnormalities in temperature gradients occur which do not permit the strict application of this rule. Considerable discussion on well bore temperatures is found in the prior art. For example, an interesting compilation of well bore temperatures, as well as an empirical relationship existing between temperature and depth, as well as other variables, is found in Temperature Gradients, Van Orstrand, Problems of Petroleum Geology, at page 989 et seq., American Association of Petroleum Geologists, 1934. The instant invention is especially adaptable to the treating of geological formations having a temperature between about 80–150° F.; however, formations having temperatures in excess of this may be treated, depending upon the characteristics of the sealant which is employed.

In general, the formation to be treated should be heated to a temperature about 50° F. higher than the normal formation temperature, although in some instances it may be possible to carry out the instant invention by heating the formation to a temperature about 20° F. higher than the normal formation temperature. Also, higher temperatures may be used. The exact temperature will, of course, depend upon the type of gelling agent, limitations in the apparatus for heating the formation, and other factors which will be apparent to those skilled in the art.

The sealant which is introduced into the formation is, as has been pointed out above, a colloidal soil which will form a reversible gel rapidly at the higher temperatures existing in the more permeable strata, but which will not be affected to any appreciable extent at the lower temperatures existing in the less permeable strata. Materials having these characteristics include, but are not limited to, solutions of collodion in a mixture of amyl acetate and benzene, nitrocellulose in alcohol, sodium behenate in water, solutions of certain methylcelluloses in water, and others. The preferred compositions for use in carrying out this invention are the water solutions of those methylcelluloses having a sufficient number of carboxy substituents to influence their water-solubility. The decisive factor in regard to solubility appears to depend largely upon the origin of the cellulose, as well as the conditions of methylation. A suitable methylcellulose is available from Dow Chemical Co. and is sold under the mark "Methocel." Details of other suitable water-soluble methylcelluloses can be found in the literature (vide references cited in Studies on Sol-Gel Transformations, Heyman, Transactions of the Faraday Society, vol. 31 at p. 847, 1935). A characteristic of methylcelluloses as sealants which makes them useful is the variety of methods which may be employed to change their transition point. Variation in transition point, which permits the methylcellulose sealants to be more flexible in their application may be effected by modifying the solution concentration, addition of inorganic salts to the sol, or changing the degree of methylation in accordance with known techniques.

In order to realize a maximum appreciation in drainage efficiency of the formation being treated, it is necessary to remove the gelatinous sealant from within the more permeable streaks after the less permeable streaks have been treated with a suitable treating agent, such as an acidizing medium or a hydraulic fracturing fluid. In order to bring about this objective, the formation may be allowed to cool to its normal formation temperature. In the process of cooling, the gel remaining in the formation interstices will revert to the sol and flow back into the well bore. If it is desired to expedite the solation, the gelatinous sealant may be peptized by accelerating the cooling of the formation by the use and application of suitable coolants.

In carrying out the instant invention, siliceous, calcareous or dolomitic formations may be treated. A specific line of demarcation between those streaks which will be isolated in accordance with this invention and those streaks which will not be isolated cannot be specifically set forth inasmuch as the time element involved is an important factor in the instant invention. In other words, as has been pointed out above, after being heated in accordance with this invention, the less permeable streaks will cool much faster than the more permeable streaks.

Therefore, the time required for the gel in the less permeable streaks to peptize and permit the formation penetrator to enter the unsealed streaks will depend upon the rate of cooling, characteristics of the sealant, etc. While this time can be determined experimentally, it is not necessary to do so if the preferred embodiment of the invention is employed. In carrying out this expedient it will be recalled that the entire formation is sealed by the indiscriminate introduction of the sealant. The formation penetrator, which is disposed in the well bore, is maintained under an applied pressure. As soon as the gelled sealant in the less permeable streaks reverts to the liquid state the formation penetrator will flow therein and function in its intended capacity.

The sealants which are employed in this invention preferably will have a transition point, where they are transformed from the sol to the gel state, and vice-versa, about half-way between the normal formation temperature and the temperature which is induced in the formation by the use of a suitable heat-transfer technique. The selection of the transition point of the sealant will, of course, depend upon the desires of those employing the instant invention. For example, in the event that the introduction of the formation penetrator can be accomplished within a short period of time, it may be desired to employ a gelatable material which will have a transition point closer to the temperature which is induced in the formation. This will permit the formation to be completely unsealed as soon as possible. On the other hand, if longer periods of time are required for effecting the subsequent treating step, it may be necessary to employ sealants having transition points which are less than about half-way between the formation temperature and the temperature induced in the formation. The transition point of the above-described substances from which the thermal-reversible sealants are prepared can be varied in accordance with conventional methods. Accordingly, the formation penetrator is introduced into the desired sections of the formation without further ado. In order to illustrate the time element involved in the transfer of heat in the formation of varying permeability for a specific set of conditions, a heat-transfer study was made on a formation have a porosity of 0.2 and a normal temperature of 150° F. From this study it was determined that when a temperature of a formation is raised 25° F. above normal formation temperature by the injection of a heated fluid, 0.25, 10 and 60 minutes, respectively, were required for streaks having a permeability of 1, 10 and 100 millidarcies, respectively, to revert to normal formation temperature. It is thus seen that this provides sufficient time for the treatment of the less permeable streaks with a formation penetrator without treating the adjacent more permeable streaks. Considerable flexibility is afforded in selectively separating and isolating the more permeable streaks from the less permeable streaks to permit the selective use of a formation penetrator. In employing the instant invention as a means for effecting the selective acidization of a producing interval, any conventional acidizing agent selected for the type of formation being treated may be employed. This includes, but is not limited to, the use of hydrochloric acid for the treatment of calcareous and dolomitic formations and fluophosphoric acids in the treatment of siliceous reservoirs. Similarly, conventional hydraulic fracturing techniques, such as those described in U. S. Patents, 2,596,843, Reissue Patent 23,733; 2,664,954; 2,667,224 and 2,667,457 may be employed. The instant invention is particularly adapted to the treatment of geological streaks of varying permeability which exist within a single formation. However, by means of packers or other suitable devices, it is possible to similarly treat a plurality of adjacent formations which are separated by impermeable strata that provide a seat for the packing devices employed. However, in the event that such conditions for the use of mechanical packers are not available, extensive formations may be treated upon employing suitable heat-transfer apparatus for inducing an elevated temperature within the formation.

Accordingly, I claim as my invention:

1. In the treatment of a geological formation containing random streaks varying in permeability each to the other, a process for isolating the more permeable streaks of a geological formation traversed by a bore hole from the less permeable streaks, which comprises forcing into said formation a heated, liquid heat-transfer medium whereby said formation is heated to a temperature of not less than about 20° F. in excess of normal formation temperatures, introducing in said formation a colloidal sol which will form, at the elevated temperature produced in the formation, a thermal-reversible gel solatable upon cooling, whereby said sol is gelated within said formation, allowing said formation to cool for a time sufficient for the temperature in the less permeable streaks to revert to a temperature substantially below the temperature in said more permeable streaks, whereby said sol will remain gelated in the said more permeable streaks but will peptize in said less permeable streaks, and forcing into said unsealed, less permeable streaks an acidizing agent capable of reacting with said formation in an amount sufficient to reduce the resistance of said formation to the flow of fluids therethrough.

2. A method in accordance with claim 1 in which said heat-transfer medium is water.

3. In the treatment of a geological formation containing random streaks varying in permeability each to the other, a process for isolating the more permeable streaks of a geological formation traversed by a bore hole from the less permeable streaks, which comprises forcing into said formation a heated, liquid heat-transfer medium whereby said formation is heated to a temperature of not less than about 20° F. in excess of normal formation temperatures, allowing said formation to cool for a time sufficient for the temperature in the less permeable streaks to revert to a temperature substantially below the temperature in said more permeable streaks, introducing into said formation a colloidal sol which will form, at the elevated temperature occurring in said more permeable streaks, a thermal-reversible gel solatable upon cooling, whereby said gel will gelate in said more permeable streaks but will peptize in said less permeable streaks, gelating said sol within said more permeable streaks, and introducing into said unsealed, less permeable streaks an acidizing agent capable of reacting with said formation in an amount sufficient to reduce the resistance of said formation to the flow of fluids therethrough.

4. A method in accordance with claim 3 in which said heat-transfer medium is water.

5. In the treatment of a borehole-traversed formation containing random streaks varying in permeability, each to the other, a process for selectively isolating the more permeable streaks of said formation from the less permeable streaks which comprises forcing into said formation a heated, liquid heat-transfer medium whereby said formation is heated to a temperature not less than about 20° F. in excess of normal formation temperature, introducing into said formation an aqueous sol of a carboxymethylcellulose, said sol having a sol-gel transition point at a temperature not more than about half-way between the normal formation temperature and the temperature which is induced in said formation by the introducing of said transfer medium into said formation, whereby said sol is gelated within said formation, allowing said formation to cool for a time sufficient for the temperature in the less permeable streaks to revert to a temperature substantially below the temperature in said more permeable streaks, whereby said sol will remain gelated in the said more permeable streaks but will peptize in said less permeable streaks, and forcing into said unsealed, less permeable streaks a formation penetrator whereby the resistance of said less permeable streaks to the flow of fluids therethrough is reduced.

6. A method in accordance with claim 5 in which said heat transfer medium is water.

7. A method in accordance with claim 4 in which the normal formation temperature of said formation is between about 80°–150° F.

8. A process in accordance with claim 4 in which the temperature induced in said formation is about 50° F. higher than normal formation temperature.

References Cited in the file of this patent

UNITED STATES PATENTS

| | | |
|---|---|---|
| 1,307,027 | Swan | June 17, 1919 |
| 2,223,804 | Kennedy | Dec. 3, 1940 |
| 2,543,868 | Prokop | Mar. 6, 1951 |
| 2,689,230 | Cardwell et al. | Sept. 14, 1954 |